United States Patent [19]

Dunan

[11] Patent Number: 4,691,843
[45] Date of Patent: Sep. 8, 1987

[54] MATERIAL DISCHARGE APPARATUS

[75] Inventor: Andrew J. Dunan, Tufley, England

[73] Assignee: Solitec Limited, Gloucester, England

[21] Appl. No.: 802,817

[22] Filed: Nov. 29, 1985

Related U.S. Application Data

[63] Continuation of Ser. No. 652,461, Sep. 20, 1984, abandoned. Continuation of Ser. No. 284,501, Jul. 17, 1981, abandoned.

[30] Foreign Application Priority Data

Jul. 11, 1983 [GB] United Kingdom ............... 83 24314

[51] Int. Cl.⁴ .............................................. B65G 69/06
[52] U.S. Cl. ..................................... 222/58; 222/196; 222/199; 222/408.5; 222/509
[58] Field of Search ...................... 222/41, 55, 58, 196, 222/199, 200, 408.5, 47, 509

[56] References Cited

U.S. PATENT DOCUMENTS

| | | | |
|---|---|---|---|
| 2,625,301 | 1/1953 | Saxe | 222/41 X |
| 3,166,222 | 1/1965 | Schrader | 222/196 X |
| 3,297,203 | 1/1967 | Wahl | 222/47 |
| 3,733,012 | 5/1973 | Grun | 222/509 X |
| 3,820,697 | 6/1974 | Courtney | 222/196 |
| 3,834,586 | 9/1974 | Wilhelmson | 222/47 |
| 4,137,915 | 2/1979 | Kamen | 222/58 X |
| 4,270,671 | 6/1981 | Arnold | 222/58 |

Primary Examiner—Robert B. Reeves
Assistant Examiner—Russell D. Stormer
Attorney, Agent, or Firm—Nies, Webner, Kurz & Bergert

[57] ABSTRACT

Material discharge apparatus including in one embodiment, a material receiving hopper which can be attached to the outlet of a silo and carrying a conical closure member which is mounted on an actuating cylinder to be raised and lowered with respect to the wall of the receiving hopper thus to determine and control the flow of material from the silo into and through the receiving hopper. A vibrating motor is also provided, being adapted to impose a vertical oscillatory motion on the closure member thus to promote the free flow of material through the annular opening created when the closure member is in its raised position, the height of the member in this position being determined, for example, by a control device whereby the rate of flow of material can be varied.

6 Claims, 5 Drawing Figures

MATERIAL DISCHARGE APPARATUS

This is a continuation of application Ser. No. 652,461, filed Sept. 20, 1984, now abandoned, which is a continuation of application Ser. No. 284,502, filed July 17, 1981, now abandoned.

This invention concerns a material discharge apparatus for the handling of powdered, granular or other particulate solid materials, or semi-solid materials.

Such materials are widely used by the process agricultural and food industries and are normally dispensed for use from bins or silos. The materials may be delivered to the position where they are to be used in many different ways, but will normally be stored in bulk before being passed to such bins or silos.

The use of transportable containers which are adapted to be returned to a source of supply for re-filling when emptied has been proposed with a view to reducing the extent to which the materials need to be handled.

An object of the present invention is to provide material discharge apparatus which can be used to discharge materials from a bin or silo, or may be used as a so-called pile discharger for effecting and controlling the flow of materials deposited in a pile over a receiving aperture, or again for use in discharging tanker vehicles for transporting materials of the kind referred to.

According to the present invention, there is provided a material discharge apparatus comprising passage means through which material can pass downwardly from one location to another, closure means for said passage means movable with respect thereto between raised and lower positions; actuating means for effecting said movement of said closure means thus to determine and control the flow of material through said passage means; and means for vibrating the closure means to encourage the material to flow freely.

Embodiments of the invention will now be described, by way of example only, with reference to the accompanying drawings, in which.

Figure 4:
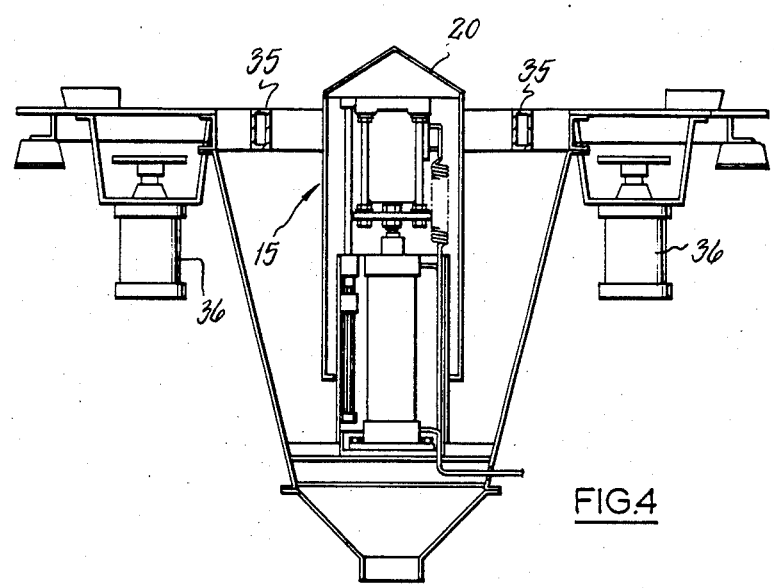
Figure 5:
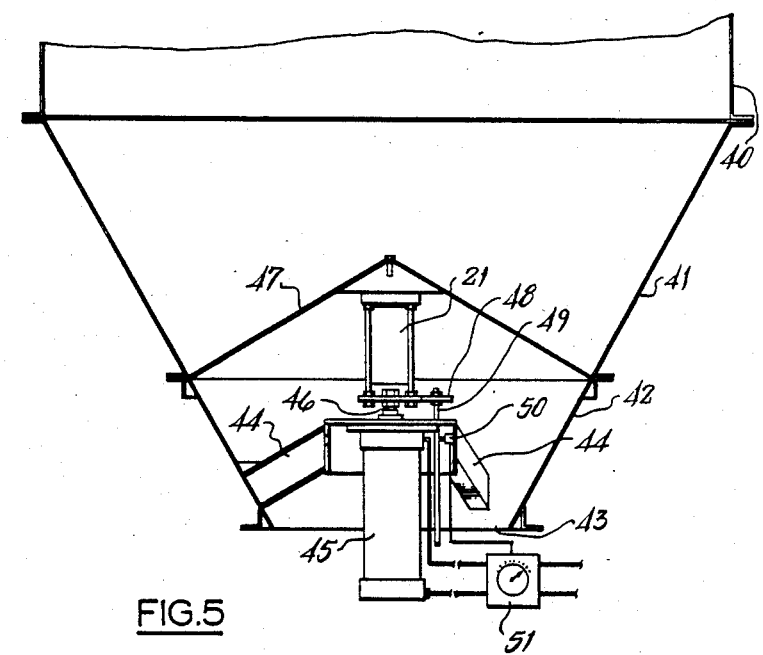

and FIGS. 4 and 5 are vertical sections through still further forms of the apparatus.

Figure 1:
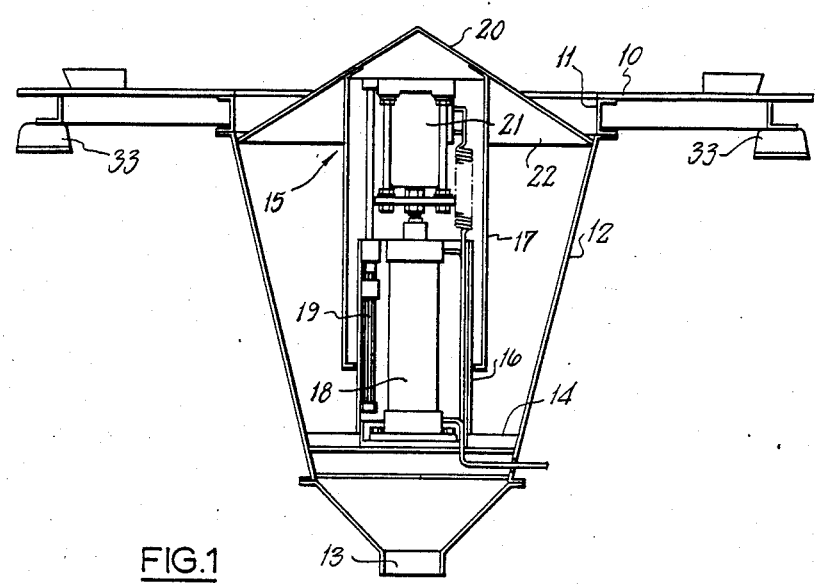
FIG. 1 is a vertical section through one form of the apparatus.
Figure 2:
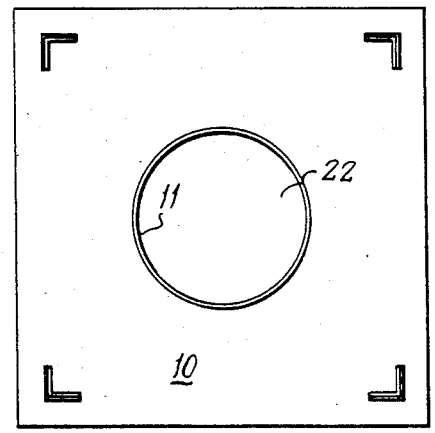
FIG. 2 is a plan view thereof.

In FIGS. 1 and 2, the apparatus comprises a platform 10 having a material discharge aperture 11 therein, the perimeter of which forms the inlet of a material receiving chute 12 which has a discharge opening 13 at its base. The chute 12 is of reducing cross-section towards its base thus to funnel materials entering the chute into a convenient stream issuing from the opening 13.

Mounted on a cross-member 14, in the lower region of the chute 12, is a lifting probe generally indicated at 15 which comprises a lower portion 16 attached to the cross-member 14, and an upper portion 17 movable vertically with respect to the portion 16. A pneumatic or hydraulic actuating ram 18 is fixed with respect to the portion 16 of the probe and serves when energised to raise and lower the portion 17. An adjusting screw 19 is provided to form a stop which pre-sets the stroke of the upper portion 17. The top of the probe 15 is formed with an upright conical surface 20 for a purpose to be described. A reciprocatary vibrating motor 21 is housed within the portion 17 of the probe to cause the surface 20 to oscillate generally vertically.

In the simple example of a pile discharger where the apparatus is provided, for example, in the floor of an area in which material is stockpiled, then the upper surface 20 of the probe forms a closure member 22. The periphery of the closure member 22 normally forms a seal against the internal wall surface of the chute 12, so that when the upper portion 17 of the probe is raised the periphery of the closure member leaves the surface of the chute and presents an annular opening through which material can be discharged into and through the chute. The dimension of this annular gap is controlled by the level to which the closure member is lifted and this can be selected according to the characteristics of the material to be discharged. Also, when material flow is to cease the probe is lowered to close the annular gap and to form a seal against continued flow. With certain materials, complete closure of the member 22 may not be necessary since the material will bridge the remaining annular gap.

Figure 3:
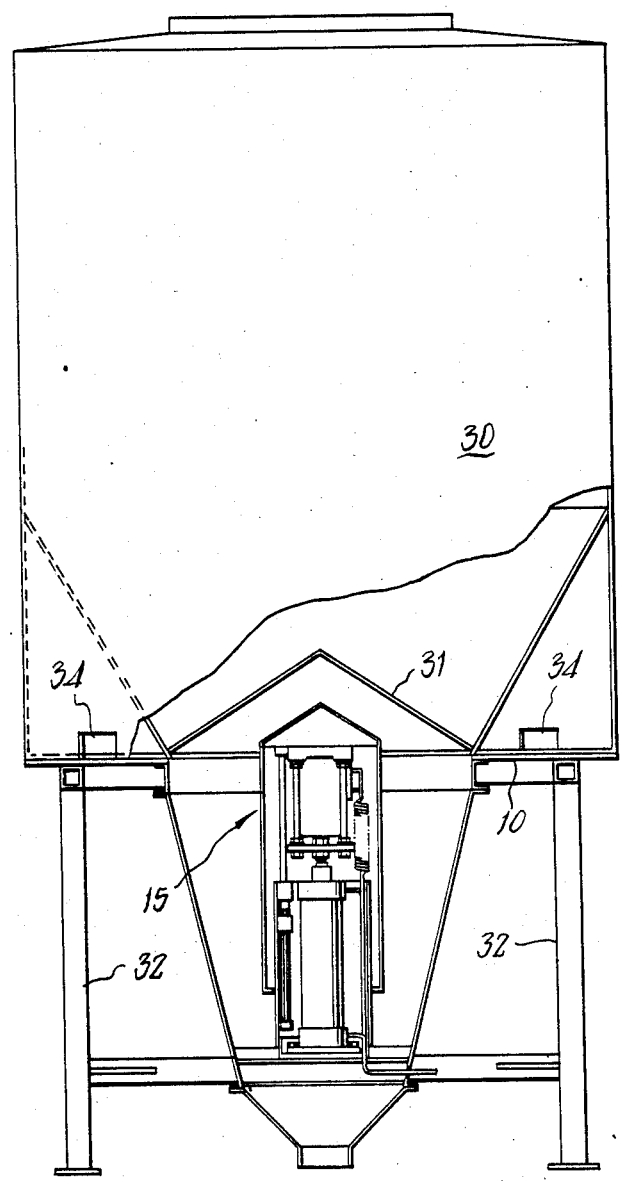
FIG. 3 is a vertical section through another form of the apparatus.

Referring now also to FIG. 3, it will be seen that the apparatus of FIGS. 1 and 2 can be used in conjunction with a fixed or movable bin 30. In this case, a conical closure member 31 is located inside the bin 30, and rests, in the closed position, against the tapering internal wall formation in the discharge region of the bin, to be raised by the probe 15 when material is to be discharged from the bin. If required, the platform 10 may be mounted on resilient bushes 33 (See FIG. 1) which act as shock absorbers when the bin 30 is lowered onto the platform. Alternatively, as shown in FIG. 3, the platform 10 can be mounted on legs 32, which if necessary can include shock absorbing members (not shown). The bin illustrated in FIG. 3 includes carrying apertures 34 to receive the forks of a standard forklift truck. However, since the probe 15 is raised and lowered with respect to the bin, the latter need only be lifted by a small amount to clear the top of the probe which will be placed in its lowered position prior to removal of the bin.

For this reason it is possible to transport bins to the discharge apparatus by means of a standard pallet truck having only a small degree of elevation of its forks. Referring to FIG. 4, it will be seen that when a pallet truck is to be used to deliver a bin to the apparatus, parallel rails 35 are provided on two sides of the receiving aperture, these rails coinciding with the distance apart of the rollers of a standard pallet truck. Also, it will be seen that small pneumatic or hydraulic rams 36 are provided adjacent each corner of the platform, and the platform is provided with apertures therein above the rams, these apertures coinciding with the positions to be taken up by the feet provided on the kind of bin to be delivered by a pallet truck. The rams are placed in the raised position prior to arrival of the bin, and are lowered once the pallet truck has been withdrawn from below the bin, so that the bin is caused to settle down over the discharge aperture.

In the embodiment of FIG. 5, the apparatus is permanently or removably mounted on the bottom of a silo 40 having a tapering outlet portion 41. A material receiving hopper 42 having a bottom outlet 43 is attached to the portion 41 to form an extension thereof.

A tripod 44 mounted on the internal surface of hopper 42 carries an actuating cylinder 45 whose ram 46 carries a conical closure member 47, the periphery of the member 47 seals against the wall of the hopper 42 when the ram 46 is lowered. Also attached to the ram 46 is a vibrating motor 21 as in the embodiments of FIGS. 1 to 4.

A plate 48 attached to the ram 46 carries a vertical rod 49 which thus rises and falls with the ram. A fixed transducer 50 is provided to detect the level of the rod 49 and thus the closure member 47. An operating signal from the transducer 50 is fed to a variable control device 51 positioned in the fluid line to the cylinder 45, so that the control device 51 can be set to determine the degree of elevation of the ram 46. Thus, the annular gap created between the wall of the hopper 42 and the closure member 47 when the latter is raised, can be maintained and varied to determine the flow rate of the material to be discharged from the silo.

The advantages seen in the present invention when considered in relation to the prior art are many fold. For example, the ability to raise and lower the conical closure member with respect to the material receiving chute enables positive closure of the discharge opening, as well as the ability to adjust the height of the closure member and thus the rate of flow according to the material being discharged. Much of the prior art has relied upon the materials bridging when vibration of the closure member ceases. Furthermore, since the mode of vibration is aligned with the direction of material flow the vibrating probe can be fixed rigidly with respect to the platform or bin, there being no need for the flexible mountings which are required where vibration is effected in a direction transversed to or angularly with respect to the direction of material flow.

Again, in view of the fact that the vibration is aligned with material flow, it is envisaged that this apparatus can be used for discharging bulk tanker vehicles, the apparatus being attached directly to the discharge aperture of the tanker. In many forms of apparatus of this general kind the vibratory energy is applied to the material receiving chute to which is rigidly attached the supporting probe for the closure member. Thus vibratory energy is transferred to the material to be discharged indirectly via the material receiving chute. In the case of the present invention the energy is transferred directly from the probe into the material, with no loss, so that the material is more readily fluidised, which gives rise to more efficient flow characteristics. Again, the ability to raise and lower the supporting probe allows the flow to be stopped at any time while material remains above the closure member.

What is claimed is:

1. Material discharge apparatus comprising: a material receiving chute having an upper and lower portion; a closure member having a continuous surface extending transversely across the upper portion of said material receiving chute in a closed, lowered position of said closure member and movable relative to the chute along a vertical axis between raised and lowered positions to control flow of material into the lower portion of said material receiving chute from a bulk store thereof above the latter; a discharge opening in the lower portion of said chute; an actuating device having a movable part for moving said closure member between raised and lowered positions; and vibrating means located within the material receiving chute and aligned with the vertical axis of said closure member to impart thereto a linear oscillatory motion in a direction parallel to the direction of movement of the closure member by said actuating device, characterized in that said actuating device is mounted centrally beneath the closure member and within the material receiving chute, and in that the movable part of the actuating device is attached to said vibrating means and moves along a single central axis aligned with the vertical axis of the closure member, thus serving to move said closure member and said vibrating means between raised and lowered positions.

2. Material discharge apparatus according to claim 1 wherein said material receiving chute is of tapering wall form and is rigidly mounted on the bottom of a bin or silo and communicating with the interior therefor; said actuating device is a fluidic cylinder whose ram is fixed rigidly to the vibrating means and the vibrating means is operatively connected to the closure member.

3. Material discharge apparatus according to claim 1 including means for adjusting the height of said closure member.

4. Material discharge apparatus according to claim 3 wherein said height adjusting means is an adjusting screw which can be preset to form a stop for the closure member.

5. Material discharge apparatus according to claim 3 wherein said height adjusting means includes means for controlling the operation of said actuating device.

6. Material discharge apparatus according to claim 1 comprising means to detect the instantaneous height of said closure member; and a control device responsive to said height detection means for maintaining the closure member at a predetermined height, said height detection means providing an operating signal for said control device.

* * * * *

UNITED STATES PATENT AND TRADEMARK OFFICE
CERTIFICATE OF CORRECTION

PATENT NO.  : 4,691,843
DATED       : September 8, 1987
INVENTOR(S) : Andrew J. Dunan It is certified that error appears in the above-identified patent and that said Letters Patent is hereby corrected as shown below:

In the Foreign Application Priority Data on the cover page, Item No. 30, cancel this line and insert the following:

--Jul. 24, 1980 [GB]  United Kingdom ......80 24314.--

Signed and Sealed this

First Day of March, 1988

Attest:

DONALD J. QUIGG

*Attesting Officer*  *Commissioner of Patents and Trademarks*